United States Patent
Su et al.

(10) Patent No.: US 9,973,400 B2
(45) Date of Patent: May 15, 2018

(54) NETWORK FLOW INFORMATION COLLECTION METHOD AND APPARATUS

(71) Applicant: Huawei Technologies Co., Ltd., Shenzhen (CN)

(72) Inventors: Jinzhao Su, Beijing (CN); Jiao Wang, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days. days.

(21) Appl. No.: 15/442,544

(22) Filed: Feb. 24, 2017

(65) Prior Publication Data

US 2017/0171039 A1    Jun. 15, 2017

Related U.S. Application Data

(63) Continuation of application No. PCT/CN2014/085108, filed on Aug. 25, 2014.

(51) Int. Cl.
*H04L 12/28* (2006.01)
*H04L 12/26* (2006.01)
*H04L 29/06* (2006.01)

(52) U.S. Cl.
CPC .............. *H04L 43/04* (2013.01); *H04L 69/22* (2013.01)

(58) Field of Classification Search
None
See application file for complete search history.

(56) References Cited

U.S. PATENT DOCUMENTS 8,964,563 B2 *   2/2015   Jocha .................... H04L 43/026
                                                     370/235
9,215,093 B2 * 12/2015   Han ..................... H04L 12/4633
(Continued)

FOREIGN PATENT DOCUMENTS

CN       101321088 A    12/2008
CN       103460666 A    12/2013
(Continued)

OTHER PUBLICATIONS

"Open Flow Switch Specification", Version 1.1.0 Implemented (Wire Protocol 0x02), Feb. 28, 2011, Retrieved from the internet: http://www.archive.openflow.org/documents/openflow-spec-v1.1.0.pdf, 56 pages.

(Continued)

*Primary Examiner* — Michael J Moore, Jr.

(57) ABSTRACT

A network flow information collection method and apparatus. A switching device receives a data packet, and collects network flow information of the data packet according to all flow entries when the data packet passes from an ingress port to an egress port in the switching device. All flow entries when a same network flow data packet passes from the ingress port to the egress port in the switching device are the same, and all flow entries when different network flow data packets pass from the ingress port to the egress port in the switching device are different. That is, all the flow entries passed from the ingress port to the egress port can uniquely identify one network flow. Therefore, each piece of the network flow information forwarded by the switching device can be accurately collected, improving accuracy of collecting network flow information by the switching device.

16 Claims, 9 Drawing Sheets

(56) References Cited

U.S. PATENT DOCUMENTS

| | | | |
|---|---|---|---|
| 2011/0283016 A1* | 11/2011 | Uchida | H04L 47/125 709/235 |
| 2012/0099591 A1* | 4/2012 | Kotha | H04L 45/54 370/392 |
| 2013/0124707 A1* | 5/2013 | Ananthapadmanabha | H04L 45/7457 709/223 |
| 2013/0163426 A1* | 6/2013 | Beliveau | H04L 67/327 370/235 |
| 2013/0176888 A1 | 7/2013 | Kubota et al. | |
| 2013/0304915 A1* | 11/2013 | Kawai | H04L 43/026 709/224 |
| 2014/0032736 A1* | 1/2014 | Mounaouar | H04L 43/026 709/224 |
| 2014/0146674 A1 | 5/2014 | Wang et al. | |
| 2014/0169179 A1* | 6/2014 | Ding | H04L 43/0811 370/241.1 |
| 2015/0180769 A1* | 6/2015 | Wang | H04L 45/38 370/236 |
| 2016/0269287 A1* | 9/2016 | Li | H04L 49/3009 |
| 2017/0208005 A1* | 7/2017 | Luke | H04L 47/125 |

FOREIGN PATENT DOCUMENTS

| | | |
|---|---|---|
| EP | 2824878 A1 | 1/2015 |
| WO | 2013/133400 A1 | 9/2013 |

OTHER PUBLICATIONS

"OpenFlow Switch Specification, Version 1.3.4 (Protocol version 0x04)", Open Networking Foundation, Mar. 27, 2014, 171 pages.

"OpenFlow Switch Specification, Version 1.4.0 (Wire Protocol 0x05)", Open Networking Foundation, Oct. 14, 2013, 206 pages.

"OpenFlow Switch Specification, Version 1.0.0 (Wire Protocol 0x01)", Open Networking Foundation, Dec. 31, 2009, 44 pages.

\* cited by examiner

NETWORK FLOW INFORMATION COLLECTION METHOD AND APPARATUS

CROSS-REFERENCE TO RELATED APPLICATIONS

This application is a continuation of International Application No. PCT/CN2014/085108, filed on Aug. 25, 2014, the disclosure of which is hereby incorporated by reference in its entirety.

TECHNICAL FIELD

Embodiments of the present disclosure relate to communications technologies, and in particular, to a network flow information collection method and apparatus.

BACKGROUND

A core idea of software-defined networking (SDN) is separating network control forwarding logic from a physical forwarding plane. The network control forwarding logic is executed by a controller, and the physical forwarding plane is executed by a switching device. The switching device forwards a data packet according to a forwarding entry delivered by the controller. A most commonly used protocol between the controller and the switching device is referred to as the OpenFlow (OF) protocol. In the SDN, the controller can control resource allocation and network flow scheduling from a networkwide perspective and optimize resource utilization. However, how the controller obtains information about each network flow in the SDN is a vital issue.

In the prior art, the switching device collects a quantity of packets, a quantity of bytes, a quantity of flow entries, time, and other related information that are forwarded by a network flow that passes through each flow entry. In the OpenFlow standard, by exchanging a network flow statistics request message and a response message between the controller and the switching device, a quantity of packets, a quantity of bytes, a quantity of flow entries, time, and other related information that are forwarded by a match field for one or more flow entries of a specified field and that are in a flow table of the switching device may be obtained.

However, because a same flow entry may be successfully matched by multiple network flows, a statistical value of the flow entry is an aggregate value of the multiple network flows that successfully match the entry, rather than collecting information about each network flow. An amount of data when the switching device forwards a single network flow cannot be presented, and the information about each network flow cannot be calculated from statistical information of the flow entry. In addition, a same network flow may be matched by multiple flow entries of different flow tables in the switching device, causing repeated collection of forwarding data of each network flow by the switching device. In conclusion, by using the method in the prior art, accuracy of collecting network flow information by the switching device is not high.

SUMMARY

Embodiments of the present disclosure provide a network flow information collection method and apparatus, so as to improve accuracy of collecting network flow information by a switching device.

A first aspect of embodiments of the present disclosure provides a network flow information collection method, including:

receiving, by a switching device, a data packet;

generating, by the switching device, a network flow identifier of the data packet according to all flow entries when the data packet passes from an ingress port to an egress port in the switching device; and updating, by the switching device, network flow information corresponding to the network flow identifier.

With reference to the first aspect, in a first possible implementation manner, the generating, by the switching device, a network flow identifier of the data packet according to all flow entries when the data packet passes from an ingress port to an egress port in the switching device includes:

obtaining, by the switching device, identifiers of all the flow entries when the data packet passes from the ingress port to the egress port in the switching device; and generating, by the switching device, the network flow identifier of the data packet according to the identifiers of all the flow entries when the data packet passes from the ingress port to the egress port in the switching device.

With reference to the first possible implementation manner of the first aspect, in a second possible implementation manner, the generating, by the switching device, the network flow identifier of the data packet according to the identifiers of all the flow entries when the data packet passes from the ingress port to the egress port in the switching device includes:

sequentially arranging, by the switching device, the identifiers of all the flow entries when the data packet passes from the ingress port to the egress port in the switching device, to generate the network flow identifier of the data packet.

With reference to the first aspect, in a third possible implementation manner, before the updating, by the switching device, network flow information corresponding to the network flow identifier, the method further includes:

establishing storage space for storing the network flow identifier and the network flow information corresponding to the network flow identifier.

With reference to the third possible implementation manner of the first aspect, in a fourth possible implementation manner, the updating, by the switching device, network flow information corresponding to the network flow identifier includes:

searching, by the switching device, whether the storage space stores the network flow identifier of the data packet; and updating the network flow information corresponding to the network flow identifier if the storage space stores the network flow identifier of the data packet.

With reference to the fourth possible implementation manner of the first aspect, in a fifth possible implementation manner, the method further includes: if the storage space does not store the network flow identifier of the data packet, adding the network flow identifier to the storage space, and updating the network flow information corresponding to the network flow identifier.

With reference to any one of the first aspect, or the first to the fifth possible implementation manners of the first aspect, in a sixth possible implementation manner, before the generating, by the switching device, a network flow identifier of the data packet according to all flow entries when the data packet passes from an ingress port to an egress port in the switching device, the method further includes:

checking, by the switching device, whether flow table space stores a flow entry that matches the data packet;

if the flow table space does not store the flow entry that matches the data packet, sending, by the switching device, the data packet to a controller, so that the controller generates, according to the data packet, the flow entry that matches the data packet; and receiving, by the switching device, the flow entry that matches the data packet and that is sent by the controller.

With reference to any one of the first aspect, or the first to the sixth possible implementation manners of the first aspect, in a seventh possible implementation manner, the method further includes:

receiving, by the switching device, a network flow information query request sent by the controller, where the request includes a match field;

generating, by the switching device, a to-be-queried network flow identifier according to the match field;

obtaining, by the switching device, network flow information corresponding to the to-be-queried network flow identifier; and sending, by the switching device, the network flow information corresponding to the to-be-queried network flow identifier to the controller.

With reference to any one of the first aspect, or the first to the seventh possible implementation manners of the first aspect, in an eighth possible implementation manner, the network flow information includes at least one of the following information:

a quantity of data packets of the network flow forwarded by the switching device;

a size of a data packet of the network flow forwarded by the switching device;

an average size of the data packets of the network flow forwarded by the switching device;

an interval at which the switching device forwards the data packets of the network flow;

a rate of forwarding the network flow by the switching device; or bandwidth occupied by the switching device to forward the network flow.

A second aspect of embodiments of the present disclosure provides a network flow information collection apparatus, including:

a data packet transceiver module, configured to receive a data packet; and a network flow statistics collection module, configured to: generate a network flow identifier of the data packet according to all flow entries when the data packet passes from an ingress port to an egress port in a switching device, and update network flow information corresponding to the network flow identifier.

With reference to the second aspect, in a first possible implementation manner, the network flow statistics collection module includes:

a first obtaining unit, configured to obtain identifiers of all the flow entries when the data packet passes from the ingress port to the egress port in the switching device; and a processing unit, configured to generate the network flow identifier of the data packet according to the identifiers of all the flow entries when the data packet passes from the ingress port to the egress port in the switching device.

With reference to the first possible implementation manner of the second aspect, in a second possible implementation manner, the processing unit is configured to sequentially arrange the identifiers of all the flow entries when the data packet passes from the ingress port to the egress port in the switching device, to generate the network flow identifier of the data packet.

With reference to the second aspect, in a third possible implementation manner, the network flow statistics collection module further includes an establishment unit, configured to establish storage space for storing the network flow identifier and the network flow information corresponding to the network flow identifier.

With reference to the third possible implementation manner of the second aspect, in a fourth possible implementation manner, the network flow statistics collection module further includes:

a searching unit, configured to search whether the storage space stores the network flow identifier of the data packet; and an updating unit, configured to update the network flow information corresponding to the network flow identifier if the storage space stores the network flow identifier of the data packet.

With reference to the fourth possible implementation manner of the second aspect, in a fifth possible implementation manner, the updating unit is further configured to: if the storage space does not store the network flow identifier of the data packet, add the network flow identifier to the storage space, and update the network flow information corresponding to the network flow identifier.

With reference to any one of the second aspect, or the first to the fifth possible implementation manners of the second aspect, in a sixth possible implementation manner, the apparatus further includes a flow table matching module, configured to: check whether flow table space stores a flow entry that matches the data packet; if the flow table space does not store the flow entry that matches the data packet, send the data packet to a controller, so that the controller generates, according to the data packet, the flow entry that matches the data packet; and receive the flow entry that matches the data packet and that is sent by the controller.

With reference to any one of the second aspect, or the first to the sixth possible implementation manners of the second aspect, in a seventh possible implementation manner, the network flow statistics collection module further includes:

a receiving unit, configured to receive a network flow information query request sent by the controller, where the request includes a match field;

a generation unit, configured to generate a to-be-queried network flow identifier according to the match field;

a second obtaining unit, configured to obtain network flow information corresponding to the to-be-queried network flow identifier; and a sending unit, configured to send the network flow information corresponding to the to-be-queried network flow identifier to the controller.

With reference to any one of the second aspect, or the first to the seventh possible implementation manners of the second aspect, in an eighth possible implementation manner, the network flow information includes at least one of the following information:

a quantity of data packets of the network flow forwarded by the switching device;

a size of a data packet of the network flow forwarded by the switching device;

an average size of the data packets of the network flow forwarded by the switching device;

an interval at which the switching device forwards the data packets of the network flow;

a rate of forwarding the network flow by the switching device; or bandwidth occupied by the switching device to forward the network flow.

A third aspect of embodiments of the present disclosure provides a network flow information collection apparatus, where the network flow information collection apparatus is a switching device, the switching device includes a processor, a memory, a communications interface, and a bus, and the processor, the memory, and the communications interface communicate by using the bus; and the switching device further includes a data packet transceiver module and a network flow statistics collection module, where the data packet transceiver module is configured to receive a data packet; and the network flow statistics collection module is configured to: generate a network flow identifier of the data packet according to all flow entries when the data packet passes from an ingress port to an egress port in the switching device, and update network flow information corresponding to the network flow identifier.

According to the network flow information collection method and apparatus provided in the embodiments of the present disclosure, a switching device receives a data packet, and collects network flow information of the data packet according to all flow entries when the data packet passes from an ingress port to an egress port in the switching device. All flow entries when a same network flow data packet passes from the ingress port to the egress port in the switching device are the same, and all flow entries when different network flow data packets pass from the ingress port to the egress port in the switching device are different. That is, all the flow entries passed from the ingress port to the egress port can uniquely identify one network flow. Therefore, by collecting the network flow information of the data packet according to all the flow entries when the data packet passes from the ingress port to the egress port in the switching device, each piece of the network flow information forwarded by the switching device can be accurately collected, improving accuracy of collecting network flow information by the switching device.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and persons of ordinary skill in the art may still derive other drawings from these accompanying drawings without creative efforts.

DETAILED DESCRIPTION

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by persons of ordinary skill in the art based on the embodiments of the present disclosure without creative efforts shall fall within the protection scope of the present disclosure.

Figure 1:
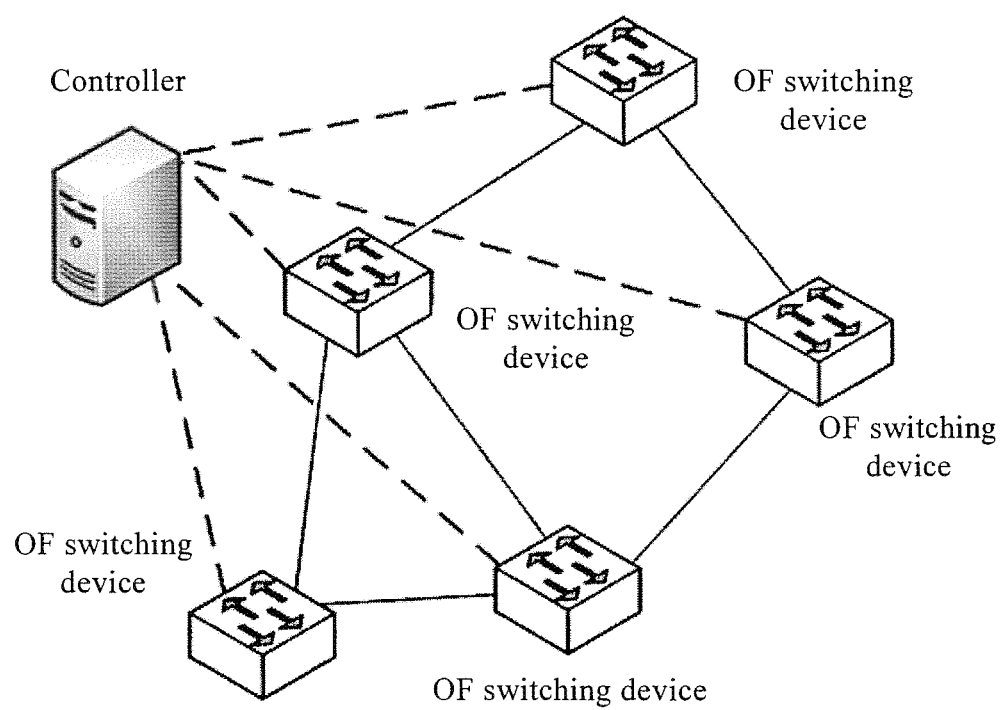
FIG. 1 is a schematic diagram of an application scenario according to an embodiment of the present disclosure.

An application scenario of an embodiment of the present disclosure is mainly SDN. The SDN mainly includes a controller that executes network control logic and several switching devices that execute data plane forwarding. The controller and a single switching device establish communication in a dedicated physical wire or in-band manner. A most commonly used communications interface between the controller and the switching device is the OF protocol. A schematic diagram of the application scenario of this embodiment of the present disclosure is shown in FIG. 1. FIG. 1 is the schematic diagram of the application scenario of this embodiment of the present disclosure. In FIG. 1, interconnection between the controller and the switching device is shown using a dashed line, and interconnection between switching devices is shown using a solid line.

Figure 2:
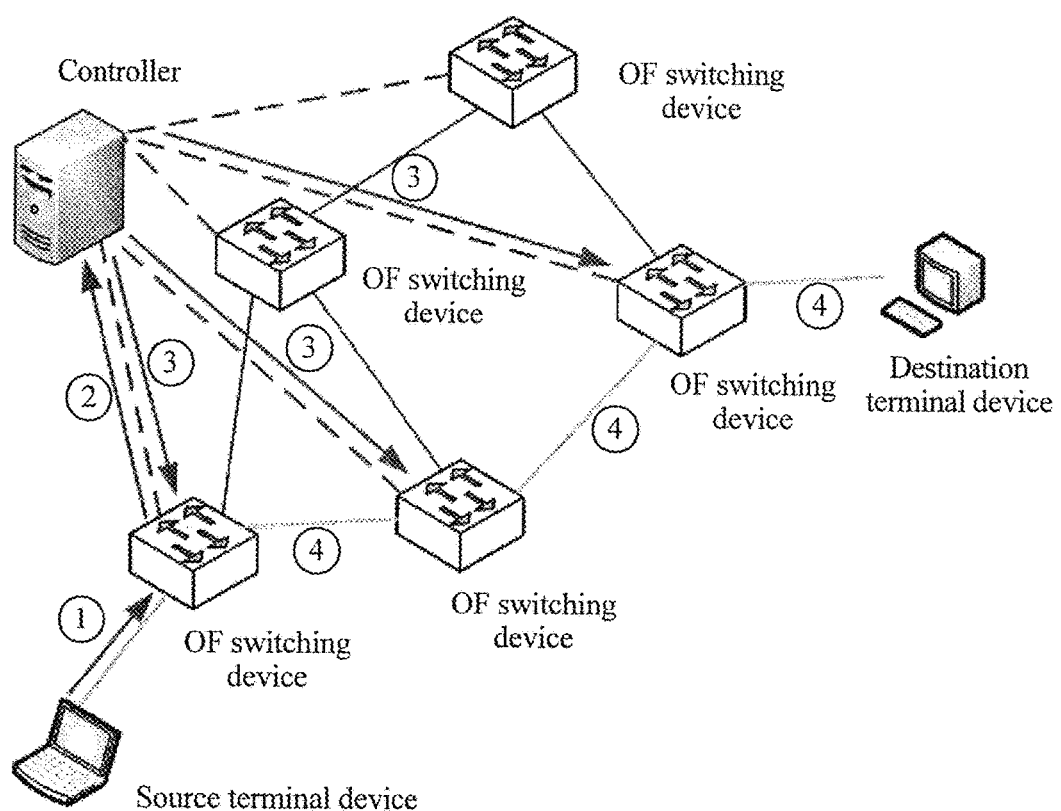
FIG. 2 is a schematic diagram of an SDN network flow processing procedure according to an embodiment of the present disclosure.

In an SDN network, in addition to connecting to the controller and another switching device, the switching device may further connect to some terminal devices. A terminal device carries an upper-layer network service. After a user initiates a new service request on a source terminal device, the source terminal device sends a first data packet of a network flow (a data flow of the new service) to a nearest access switching device. Because flow table space of the switching device does not store a forwarding entry for the data packet, the switching device fails in a matching attempt. At the same time of buffering the first data packet, the first data packet is encapsulated as a request message and is reported to the controller (the request message is referred to as a "PacketIn message" in the OpenFlow protocol). The controller checks a source Internet Protocol (IP) address, a destination IP address, a VLAN field value, and other information in the first data packet, calculates an optimal path for a network flow of the first data packet according to a current routing policy, and delivers a flow entry modification message (the flow entry modification message is referred to as a "FlowMod message" in the OpenFlow protocol) to a switching device on the optimal path. The switching device that receives the FlowMod message adds, deletes, or updates a corresponding flow entry in a flow table according to an instruction in the FlowMod message delivered by the controller, and after receiving a data packet of a same network flow, searches the flow table space and completes packet forwarding on the data plane according to an instruction in a matched flow entry. A network flow processing procedure is shown in FIG. 2. FIG. 2 is a schematic diagram of an SDN network flow processing procedure according to an embodiment of the present disclosure. A processing procedure of a first data packet of a network flow from a source terminal device to a destination terminal device is shown using a solid line with an arrow. A sequence number near the solid line with the arrow indicates a sequence of processing the first data packet.

In this embodiment of the present disclosure, a network flow is identified according to all flow entries when a data packet passes from an ingress port to an egress port in a switching device. All flow entries when a same network flow data packet passes from the ingress port to the egress port in the switching device are the same, and all flow entries when different network flow data packets pass from the ingress port to the egress port in the switching device are different. Therefore, a network flow identifier generated according to all the flow entries when the data packet passes from the ingress port to the egress port in the switching device can uniquely identify one network flow. By collecting network flow information of the data packet based on the foregoing network flow identifier, each piece of the network flow information forwarded by the switching device can be accurately collected, improving accuracy of collecting network flow information by the switching device.

Figure 3:
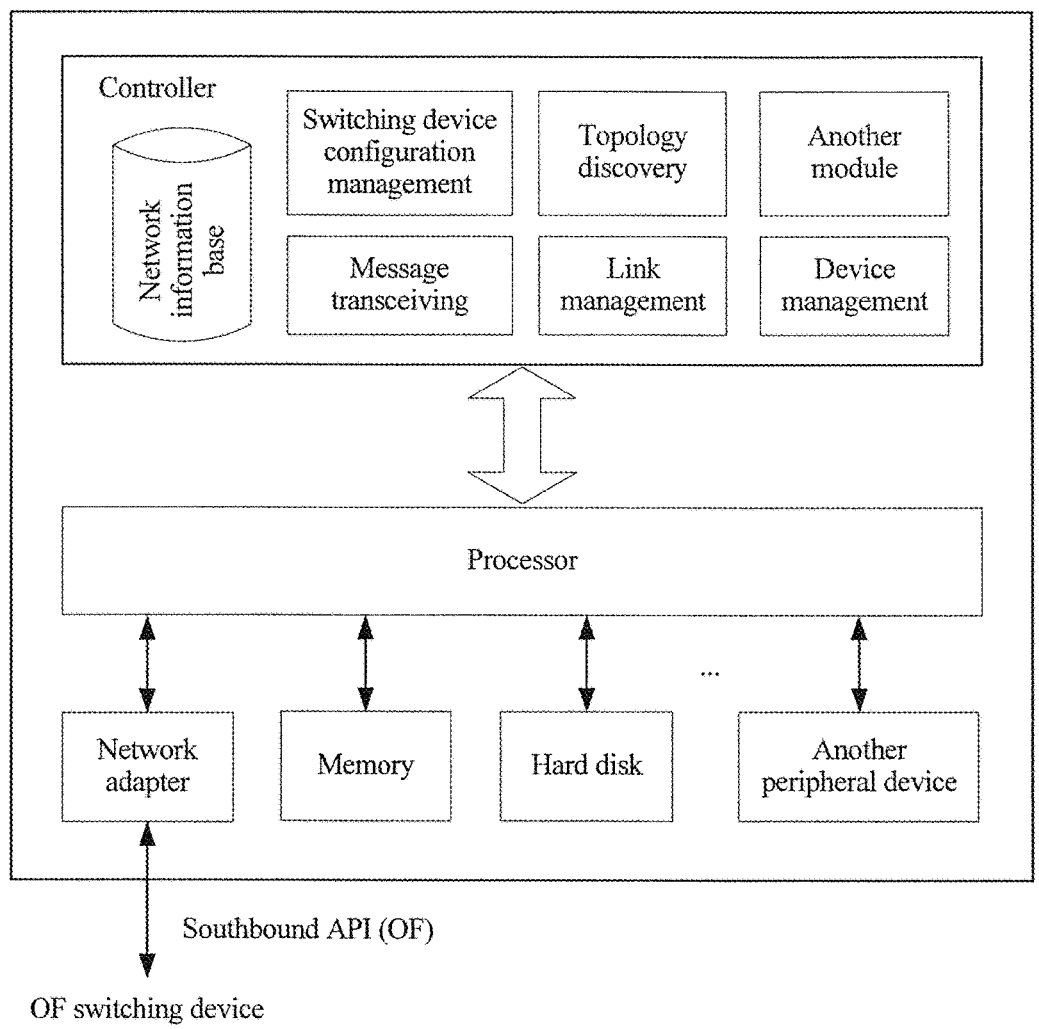
FIG. 3 is a schematic structural diagram of a controller according to an embodiment of the present disclosure.

A controller used in an embodiment of the present disclosure is shown in FIG. 3. FIG. 3 is a schematic structural diagram of the controller according to this embodiment of the present disclosure. The controller usually runs on a server with relatively high hardware configuration, uses a general-purpose architecture, and communicates with an external switching device by using a network adapter. The controller mainly includes modules such as message transceiving, switching device configuration management, topology discovery, link management, and device management. To save network status information collected from a switching device, a network information base (NIB) needs to be maintained, so as to help an upper-layer control program make an optimal decision based on a real-time NIB.

Figure 4:
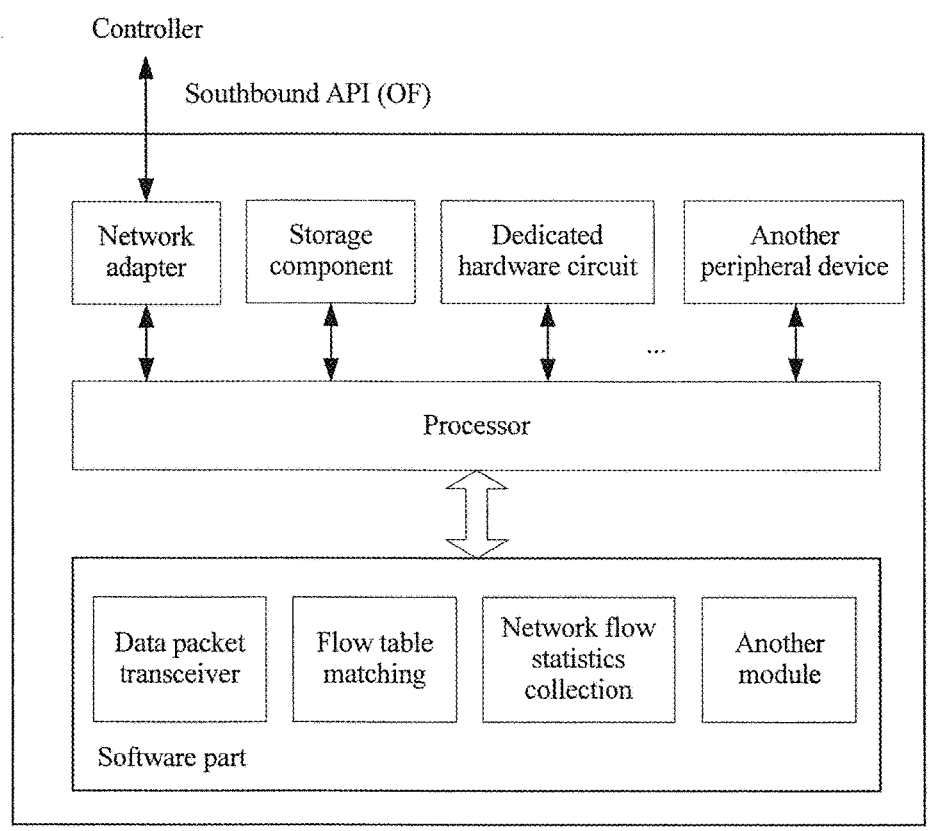
FIG. 4 is a schematic structural diagram of a switching device according to an embodiment of the present disclosure.

A structure of a switching device used in an embodiment of the present disclosure is shown in FIG. 4. FIG. 4 is a schematic structural diagram of the switching device according to this embodiment of the present disclosure. A hardware part of the switching device includes a processor, a storage component, a dedicated hardware circuit, a network adapter, another peripheral device, and the like. The switching device interacts with a controller by using the network adapter, and saves flow table space or the like of the switching device by using a Static Random Access Memory (SRAM), a Ternary Content Addressable Memory (TCAM), or another storage component. In addition to a data packet transceiver module and a flow table matching module that are included in a software part, a network flow statistics collection module is newly added in this embodiment of the present disclosure, and is mainly configured to store and maintain a network flow identifier and mapping with network flow information. The flow table matching module performs flow entry matching on a data packet received by the data packet transceiver module. The network flow statistics collection module stores and maintains the network flow identifier according to a matching result of the flow table matching module, and collects the network flow information according to the matching result of the flow table matching module. The network flow information includes at least one of the following information: a quantity of data packets of the network flow forwarded by the switching device; a size of a data packet of the network flow forwarded by the switching device; an average size of the data packets of the network flow forwarded by the switching device; an interval at which the switching device forwards the data packets of the network flow; a rate of forwarding the network flow by the switching device; bandwidth occupied by the switching device to forward the network flow, or the like.

Specific embodiments are used below to describe in detail the technical solutions of the present disclosure. The following several specific embodiments may be combined with each other, and a same or similar concept or process may not be described repeatedly in some embodiments. A switching device in each embodiment of the present disclosure refers to an OF switching device.

Figure 5:
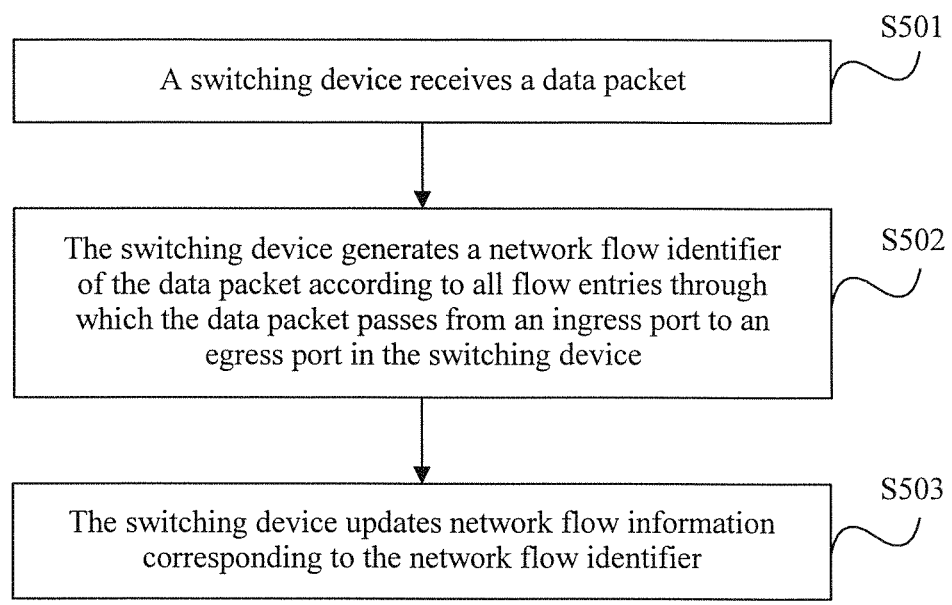
FIG. 5 is a schematic flowchart of Embodiment 1 of a network flow information collection method according to the present disclosure.

FIG. 5 is a schematic flowchart of Embodiment 1 of a network flow information collection method according to the present disclosure. As shown in FIG. 5, this embodiment is performed by a switching device, and a method of this embodiment is as follows:

S501. The switching device receives a data packet.

The data packet received by the switching device may come from a terminal device, or may come from another forwarding device.

This step may be performed by a data packet transceiver module in FIG. 4.

S502. The switching device generates a network flow identifier of the data packet according to all flow entries when the data packet passes from an ingress port to an egress port in the switching device.

The switching device obtains identifiers of all the flow entries when the data packet passes from the ingress port to the egress port in the switching device; and the switching device generates the network flow identifier of the data packet according to the identifiers of all the flow entries when the data packet passes from the ingress port to the egress port in the switching device.

S503. The switching device updates network flow information corresponding to the network flow identifier.

After the switching device receives the data packet, a flow table matching module of the switching device searches flow table space for a flow entry that matches the data packet, forwards the data packet according to an instruction in the matched flow entry. A network flow statistics collection module of the switching device identifies the network flow of the data packet according to all the flow entries when the data packet passes from the ingress port to the egress port in the switching device, and collects the network flow information.

The network flow information includes at least one of the following information: a quantity of data packets of the network flow forwarded by the switching device; a size of a data packet of the network flow forwarded by the switching device; an average size of the data packets of the network flow forwarded by the switching device; an interval at which the switching device forwards the data packets of the network flow; a rate of forwarding the network flow by the switching device; bandwidth occupied by the switching device to forward the network flow, or the like. For example, it is assumed that the switching device sequentially arranges the identifiers of all the flow entries when the data packet passes from the ingress port to the egress port in the switching device, to generate the network flow identifier of the data packet. All the flow entries when the data packet passes from the ingress port to the egress port in the switching device are respectively an entry 1 of a flow table 1, an entry 2 of a flow table 2, and an entry 3 of a flow table 3. It is assumed that "011" is an identifier of the entry 1 of the flow table 1, "022" is an identifier of the entry 2 of the flow table 2, and "033" is an identifier of the entry 3 of the flow table 3. The network flow identifier of the data packet is generated as "011022033", and the network flow information is the size of a data packet of the network flow forwarded by the switching device and the average size of the data packets of the network flow forwarded by the switching device. The size of a data packet of the network flow forwarded by the switching device is collected according to the size of the data packet. It is assumed that before the data packet is received, a recently collected total size of data packets of a flow whose network flow identifier is "011022033" and that is forwarded by the switching device is 10 M, and a size of a data packet of a flow whose network flow identifier is "011022033" and that is forwarded by the switching device this time is 2 M. A size of a data packet of a flow whose network flow identifier is "011022033" and that is forwarded by the switching device is changed to 12 M (10 M+2 M). In another implementation scenario, it is assumed that a total size of data packets of flows whose network flow identifiers are "011022033" and that are forwarded by the switching device for three times is 10 M. Before the data packet is received, a recently collected average size of data packets of a flow whose network flow identifier is "011022033" and that is forwarded by the switching device is (10/3) M. If a size of a data packet of a flow whose network flow identifier is "011022033" and that is forwarded by the switching device this time is 2 M, that is, a total size of data packets of flows whose network flow identifiers are "011022033" and that are forwarded by the switching device for four times is 12 M, an average size of data packets of a flow whose network flow identifier is "011022033" and that is forwarded by the switching device is updated into 3 M ((10+2)/4 M). Collection of other network flow information is similar to the foregoing collection process, and details are not described herein again.

In this embodiment, a switching device receives a data packet, and collects network flow information of the data packet according to all flow entries when the data packet passes from an ingress port to an egress port in the switching device. All flow entries when a same network flow data packet passes from the ingress port to the egress port in the switching device are the same, and all flow entries when different network flow data packets pass from the ingress port to the egress port in the switching device are different. That is, all the flow entries passed from the ingress port to the egress port can uniquely identify one network flow. Therefore, by collecting the network flow information of the data packet according to all the flow entries when the data packet passes from the ingress port to the egress port in the switching device, each piece of the network flow information forwarded by the switching device can be accurately collected, improving accuracy of collecting network flow information by the switching device.

Figure 6:
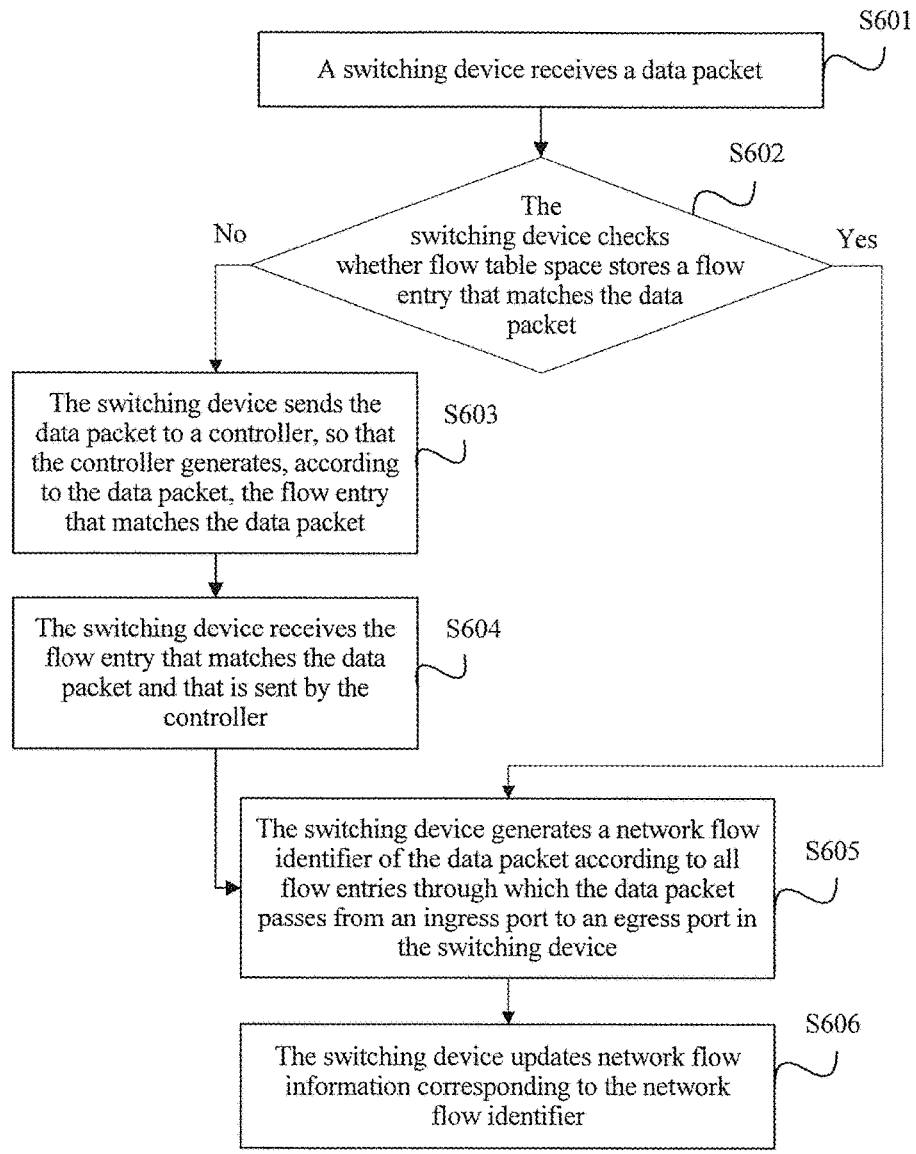
FIG. 6 is a schematic flowchart of Embodiment 2 of a network flow information collection method according to the present disclosure.

FIG. 6 is a schematic flowchart of Embodiment 2 of a network flow information collection method according to the present disclosure. As shown in FIG. 6, this embodiment is performed by a switching device, and a method of this embodiment is as follows:

S601. The switching device receives a data packet.

This step may be performed by a data packet transceiver module of the switching device.

S602. The switching device checks whether flow table space stores a flow entry that matches the data packet. If the flow table space does not store the flow entry that matches the data packet, perform S603; if the flow table space stores the flow entry that matches the data packet, perform S605.

A flow table matching module of the switching device checks whether the flow table space stores the flow entry that matches the data packet. The flow table space includes multiple flow tables, each flow table stores multiple flow entries, and different flow tables have different match fields. If the data packet is a first data packet of a network flow, generally the first flow table space that receives the data packet does not store the flow entry that matches the data packet, and S603 is performed. If the flow table space of the switching device stores the flow entry that matches the data packet, S605 is performed.

S603. The switching device sends the data packet to a controller, so that the controller generates, according to the data packet, the flow entry that matches the data packet.

A communications module that interacts with the controller and that is in the switching device encapsulates the data packet as a "PacketIn message" and reports the "PacketIn message" to the controller. After the controller generates, according to the data packet, the flow entry that matches the data packet, the flow entry that matches the data packet is sent to the switching device by using a "FlowMod message".

S604. The switching device receives the flow entry that matches the data packet and that is sent by the controller.

The data packet transceiver module of the switching device receives the flow entry that matches the data packet and that is sent by the controller, and the flow table matching module of the switching device installs, in flow table space of the switching device, the flow entry that matches the data packet.

S605. The switching device generates a network flow identifier of the data packet according to all flow entries when the data packet passes from an ingress port to an egress port in the switching device.

The flow table matching module of the switching device forwards the data packet from the ingress port to the egress port according to an instruction in the flow entry that matches the data packet. A network flow statistics collection module of the switching device generates the network flow identifier of the data packet according to all the flow entries when the data packet passes from the ingress port to the egress port in the switching device.

The network flow identifier is also referred to as a (FlowID). The network flow identifier of the data packet includes segment code corresponding to the flow entries when the data packet passes from the ingress port to the egress port in the switching device. A network flow identifier format is shown in Table 1:

TABLE 1

| Network flow identifier format | | | |
| --- | --- | --- | --- |
| SegID_1 | SegID_2 | ... | SegID_N |

A quantity N of the segment code is equal to a quantity of flow tables in the switching device. A value of each segment code is equal to relative location information of the flow entry in the flow table. The location information may be a sequence number, a relative header offset, a cookie, a hash (Hash) value of the match field, or the like. This is not limited in this embodiment of the present disclosure.

A sequence number of the flow entry in the flow table is used as an example of the location information for description. In a forwarding process of the data packet in the switching device, several flow tables in the switching device are sequentially matched. However, the data packet may leave the switching device from a port of the switching device by skipping a flow table or after being processed by an intermediate flow table. If only some flow tables of the switching device are used in the forwarding process of the data packet in the switching device, segment code corresponding to a flow table that is not used is filled with a special character (such as "#"). The flow table space of the switching device has four flow tables. A data flow sequentially passes through the second flow entry of a flow table 1 and the third flow entry of a flow table 2, and directly skips to the first flow entry of a flow table 4 to leave the switching device. In this case, the network flow identifier of the data packet may be recorded as "0102###00", where "01" represents the second flow entry of the flow table 1, "02" represents the third flow entry of the flow table 2, "###" represents not passing through a flow table 3, and "00" represents the first flow entry of the flow table 4. How many bits are used to represent segment code of each flow table is related to a quantity of flow entries that the flow table can store.

Further, the cookie is used as an example of the location information for description. The cookie is an identifier specified for a newly added flow entry when the controller delivers a (FlowMod) message and adds a flow entry. The network flow identifier may be calculated using $H_4$ ($H_3$ ($H_2$ ($H_1$ (Cookie1),Cookie2),−1), Cookie4), where $H_1$, $H_2$, $H_3$, and $H_4$ are hash (Hash) functions of the cookie, and −1 represents that a flow entry of the third flow table is not used.

Further, the hash value of the match field is used as an example of the location information for description. The network flow identifier may be calculated using $H_4(H_3(H_2(H_1(1,00:1B:21:CC:ED:C3),192.168.0.1,6843),0),$ 192.168.0.2,7652). Likewise, $H_1$, $H_2$, $H_3$, and $H_4$ and are hash (Hash) functions of four match fields.

In this embodiment of the present disclosure, a network flow identifier determining or generation method includes but is not limited to the foregoing several methods, provided that the network flow identifier is generated according to the flow entry through which the data packet passes from the ingress port to the egress port in the switching device. This is not limited in this embodiment of the present disclosure.

S606. The switching device updates network flow information corresponding to the network flow identifier.

The network flow statistics collection module of the switching device searches whether storage space stores the network flow identifier of the data packet. The network flow information corresponding to the network flow identifier is updated if the storage space stores the network flow identifier of the data packet. If the storage space does not store the network flow identifier of the data packet, the network flow identifier is added to the storage space, and the network flow information corresponding to the network flow identifier is updated. For details about how to update the network flow information corresponding to the network flow identifier, refer to detailed description of S502, and details are not described herein again.

It should be noted that in the foregoing embodiment, before the switching device updates the network flow information corresponding to the network flow identifier, the method further includes: establishing the storage space for storing the network flow identifier and the network flow information corresponding to the network flow identifier.

The storage space for storing the network flow identifier and the network flow information corresponding to the network flow identifier may be a table, a binary tree, or the like. The table is shown in Table 2:

TABLE 2

| Flow name | Network flow identifier | Byte quantity | Network flow information | | | | |
|---|---|---|---|---|---|---|---|
| | | | Packet quantity | Average packet size | Average packet interval | Start time | Duration |

Further, the network flow identifier and the network flow information corresponding to the network flow identifier may be stored in a form of the binary tree. In the storage space in which the binary tree is used for storing, the network flow identifier is a key (Key) field of a node in the tree, and the network flow information is a value (Value) field of the node in the tree. Time complexity of dynamically inserting, deleting, or searching for the node in the binary tree is O (lgN), where N is a quantity of the network flows forwarded by the switching device.

After a new data packet is received, if the storage space for storing the network flow identifier and the network flow information corresponding to the network flow identifier does not include the network flow identifier, a new network flow identifier is inserted into the storage space, and the network flow information is updated. If the storage space for storing the network flow identifier and the network flow information corresponding to the network flow identifier includes the network flow identifier, the network flow information is directly updated.

For ease of searching for and storing the network flow information, in this embodiment of the present disclosure, a size relationship of the network flow identifier is specified. The network flow identifier may be stored according to a size sequence to reduce complexity of storing and searching for the network flow information, so that it is more convenient to search for and store the network flow information. The size relationship of the network flow identifier may comply with the following several principles:

1. Lengths of all network flow identifiers are equal. 2. If segment code in a same flow table is a special character (such as "#"), the segment code is less than any valid segment code; and larger segment code in the same flow table indicates a larger network flow identifier. 3. A weight of the first segment code (corresponding to the first flow table) of the network flow identifier is the highest, a weight of the last segment code (corresponding to the last flow table) is the lowest, and a weight of a segment code sequentially reduces when a flow table number in a pipeline increases.

It is assumed that four network flow identifiers are shown in Table 3.

TABLE 3

| Flow name | Network flow identifier |
|---|---|
| A | 0102###00 |
| B | 0102###03 |
| C | 010400302 |
| D | 01##00302 |

Figure 7:
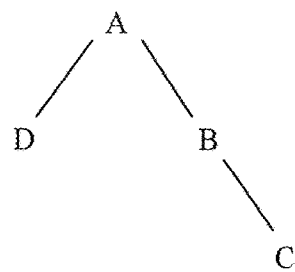
FIG. 7 is a schematic diagram of a storage structure of a binary tree according to the present disclosure.

According to the foregoing principles, a size relationship of the four network flow identifiers is as follows: D<A<B<C. A storage structure in the binary tree may be shown in FIG. 7. FIG. 7 is a schematic diagram of the storage structure of the binary tree according to the present disclosure.

In this embodiment, a switching device receives a data packet and checks whether flow table space stores a flow entry that matches the data packet. If the flow entry that matches the data packet is stored, a network flow identifier of the data packet is determined according to all flow entries when the data packet passes from an ingress port to an egress port in the switching device, and network flow information corresponding to the network flow identifier is updated. If the flow entry that matches the data packet is not stored, the switching device sends the data packet to a controller, so that the controller generates, according to the data packet, the flow entry that matches the data packet. By receiving the flow entry that matches the data packet and that is sent by the controller, the switching device determines the network flow identifier of the data packet according to all the flow entries when the data packet passes from an ingress port to an egress port in the switching device, and updates network flow information corresponding to the network flow identifier. All flow entries when a same network flow data packet passes from the ingress port to the egress port in the switching device are the same, and all flow entries when different network flow data packets pass from the ingress port to the egress port in the switching device are different. That is, all the flow entries passed from the ingress port to the egress port can uniquely identify one network flow. Therefore, by collecting the network flow information of the data packet according to all the flow entries when the data packet passes from the ingress port to the egress port in the switching device, each piece of the network flow information forwarded by the switching device can be accurately collected, improving accuracy of collecting network flow information by the switching device.

Figure 8:
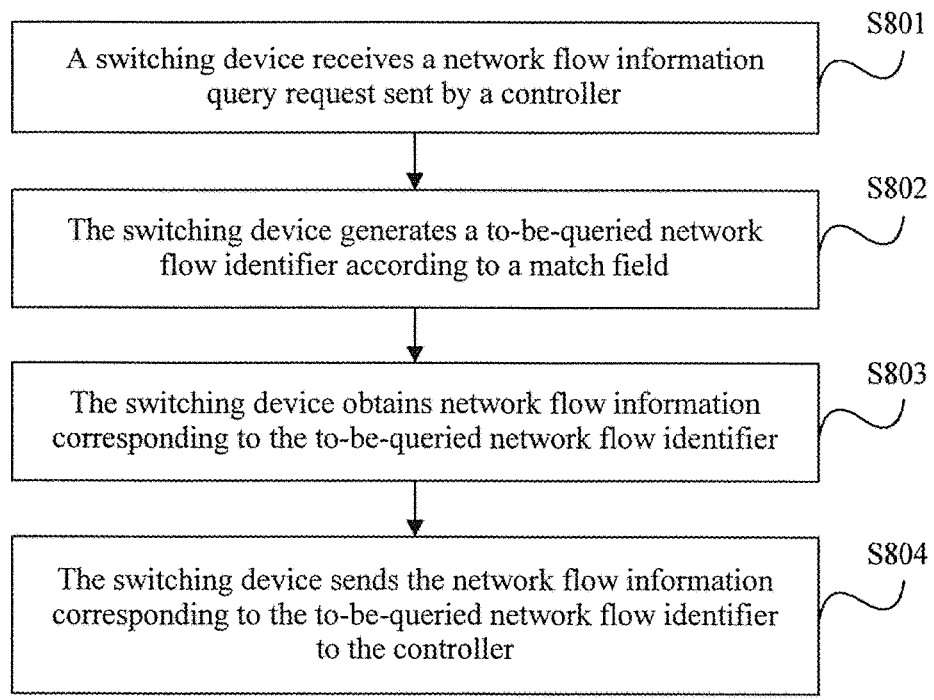
FIG. 8 is a schematic flowchart of Embodiment 3 of a network flow information collection method according to the present disclosure.

FIG. 8 is a schematic flowchart of Embodiment 3 of a network flow information collection method according to the present disclosure. On the basis of the embodiment shown in FIG. 5 or FIG. 6, the embodiment shown in FIG. 8 is a process of obtaining the network flow information from the switching device by the controller. As shown in FIG. 8, the method of this embodiment is as follows:

S801. The switching device receives a network flow information query request sent by the controller.

The request includes a match field.

The step is performed by a communications module that interacts with the controller and that is in the switching device.

S802. The switching device generates a to-be-queried network flow identifier according to the match field.

The flow table matching module of the switching device matches with each flow table according to the match field included in the request. The network flow statistics collection module generates the to-be-queried network flow identifier according to sequentially matched flow entries. The method is similar to the method of S605, and details are not described herein again.

S803. The switching device obtains network flow information corresponding to the to-be-queried network flow identifier.

The network flow statistics collection module of the switching device queries the network flow information corresponding to the to-be-queried network flow identifier from the storage space for storing the network flow identifier and the network flow information corresponding to the network flow identifier.

There may be one or more network flows that match the to-be-queried network flow identifier.

S804. The switching device sends the network flow information corresponding to the to-be-queried network flow identifier to the controller.

The communications module that interacts with the controller and that is in the switching device sends the network flow information corresponding to the to-be-queried network flow identifier to the controller.

The network flow information corresponding to the to-be-queried network flow identifier may include a quantity of matched network flows and information about each matched network flow.

In this embodiment, a controller carries specified match field information in a request message, so that a switching device generates a to-be-queried network flow identifier according to the match field information, queries, in storage space, network flow information corresponding to the to-be-queried network flow identifier, and sends the network flow information corresponding to the to-be-queried network flow identifier to the controller. In this way, the controller can accurately obtain network flow information forwarded by each switching device in a network. Further, the controller can provide the obtained network flow information in an API form to an upper-layer application, so as to further aggregate network flow statistical information or use a corresponding policy.

Figure 9:
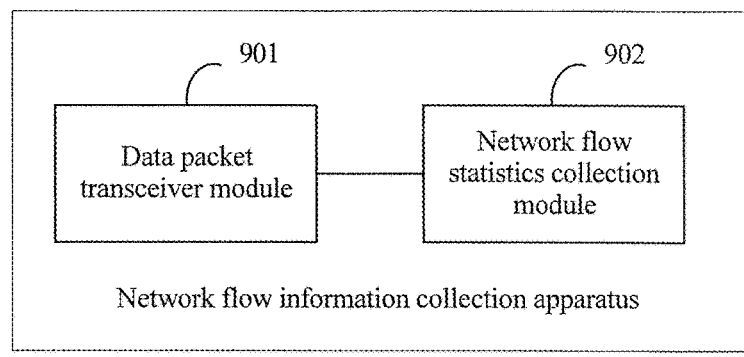
FIG. 9 is a schematic structural diagram of Embodiment 1 of a network flow information collection apparatus according to the present disclosure.

FIG. 9 is a schematic structural diagram of Embodiment 1 of a network flow information collection apparatus according to the present disclosure. The apparatus in this embodiment includes a data packet transceiver module 901 and a network flow statistics collection module 902. The data packet transceiver module 901 is configured to receive a data packet. The network flow statistics collection module 902 is configured to: generate a network flow identifier of the data packet according to all flow entries when the data packet passes from an ingress port to an egress port in a switching device, and update network flow information corresponding to the network flow identifier.

In the foregoing embodiment, the network flow statistics collection module 902 further includes a first obtaining unit and a processing unit. The first obtaining unit is configured to obtain identifiers of all the flow entries when the data packet passes from the ingress port to the egress port in the switching device. The processing unit is configured to generate the network flow identifier of the data packet according to the identifiers of all the flow entries when the data packet passes from the ingress port to the egress port in the switching device.

In the foregoing embodiment, the processing unit is configured to sequentially arrange the identifiers of all the flow entries when the data packet passes from the ingress port to the egress port in the switching device, to generate the network flow identifier of the data packet.

In the foregoing embodiment, the network flow statistics collection module 902 further includes an establishment unit. The establishment unit is configured to establish storage space for storing the network flow identifier and the network flow information corresponding to the network flow identifier.

In the foregoing embodiment, the network flow statistics collection module further includes: a searching unit, configured to search whether the storage space stores the network flow identifier of the data packet; and an updating unit, configured to update the network flow information corresponding to the network flow identifier if the storage space stores the network flow identifier of the data packet.

In the foregoing embodiment, the updating unit is further configured to: if the storage space does not store the network flow identifier of the data packet, add the network flow identifier to the storage space, and update the network flow information corresponding to the network flow identifier.

In the foregoing embodiment, a data packet transceiver module receives a data packet, and a network flow statistics collection module collects network flow information of the data packet according to all flow entries when the data packet passes from an ingress port to an egress port in the switching device. All flow entries when a same network flow data packet passes from the ingress port to the egress port in the switching device are the same, and all flow entries when different network flow data packets pass from the ingress port to the egress port in the switching device are different. That is, all the flow entries passed from the ingress port to the egress port can uniquely identify one network flow. Therefore, by collecting the network flow information of the data packet according to all the flow entries when the data packet passes from the ingress port to the egress port in the switching device, each piece of the network flow information forwarded by the switching device can be accurately collected, improving accuracy of collecting network flow information by the switching device.

Figure 10:
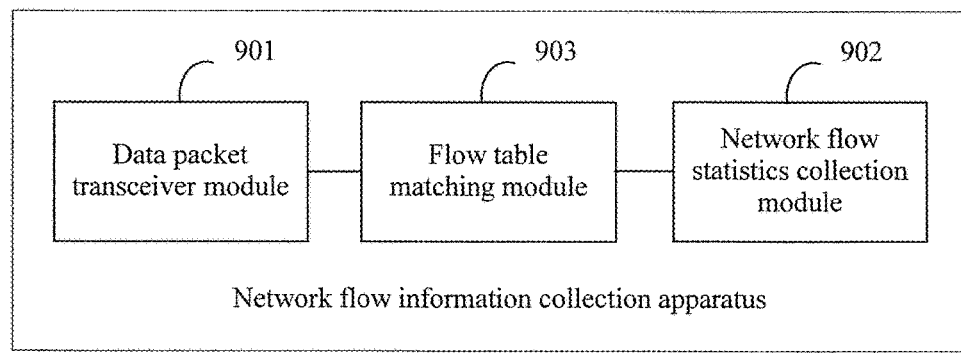
FIG. 10 is a schematic structural diagram of Embodiment 2 of a network flow information collection apparatus according to the present disclosure.

FIG. 10 is a schematic structural diagram of Embodiment 2 of a network flow info nation collection apparatus according to the present disclosure. On the basis of the embodiment shown in FIG. 9, FIG. 10 further includes a flow table matching module 903. The flow table matching module 903 is configured to: check whether flow table space stores a flow entry that matches the data packet; if the flow table space does not store the flow entry that matches the data packet, send the data packet to a controller, so that the controller generates, according to the data packet, the flow entry that matches the data packet; and receive the flow entry that matches the data packet and that is sent by the controller.

In the foregoing embodiment, the network flow statistics collection module 902 further includes a receiving unit, a generation unit, a second obtaining unit, and a sending unit. The receiving unit is configured to receive a network flow information query request sent by the controller, where the request includes a match field. The generation unit is configured to generate a to-be-queried network flow identifier according to the match field. The second obtaining unit is configured to obtain network flow information corresponding to the to-be-queried network flow identifier. The sending unit is configured to send the network flow information corresponding to the to-be-queried network flow identifier to the controller.

In the foregoing embodiment, the processing unit is configured to sequentially arrange the identifiers of all the flow entries when the data packet passes from the ingress port to the egress port in the switching device, to generate the network flow identifier of the data packet.

In the foregoing embodiment, the network flow statistics collection module 902 further includes the establishment unit, configured to establish the storage space for storing the network flow identifier and the network flow information corresponding to the network flow identifier.

In the foregoing embodiment, the network flow statistics collection module 902 further includes the searching unit and the updating unit. The searching unit is configured to search whether the storage space stores the network flow identifier of the data packet. The updating unit is configured to update the network flow information corresponding to the network flow identifier if the storage space stores the network flow identifier of the data packet.

In the foregoing embodiment, the updating unit is further configured to: if the storage space does not store the network flow identifier of the data packet, add the network flow identifier to the storage space, and update the network flow information corresponding to the network flow identifier.

In the foregoing embodiment, the flow table matching module 903 is further configured to: check whether the flow table space stores the flow entry that matches the data packet; if the flow table space does not store the flow entry that matches the data packet, send the data packet to the controller, so that the controller generates, according to the data packet, the flow entry that matches the data packet; and receive the flow entry that matches the data packet and that is sent by the controller.

In the foregoing embodiment, a data packet transceiver module receives a data packet, and a flow table matching module checks whether flow table space stores a flow entry that matches the data packet. If the flow entry that matches the data packet is stored, a network flow statistics collection module determines a network flow identifier of the data packet according to all flow entries when the data packet passes from an ingress port to an egress port in the switching device, and updates network flow information corresponding to the network flow identifier. If the flow entry that matches the data packet is not stored, the flow table matching module sends the data packet to a controller, so that the controller generates, according to the data packet, the flow entry that matches the data packet. By receiving the flow entry that matches the data packet and that is sent by the controller, the network flow statistics collection module determines the network flow identifier of the data packet according to all the flow entries when the data packet passes from an ingress port to an egress port in the switching device, and updates network flow information corresponding to the network flow identifier. All flow entries when a same network flow data packet passes from the ingress port to the egress port in the switching device are the same, and all flow entries when different network flow data packets pass from the ingress port to the egress port in the switching device are different. That is, all the flow entries passed from the ingress port to the egress port can uniquely identify one network flow. Therefore, by collecting the network flow information of the data packet according to all the flow entries when the data packet passes from the ingress port to the egress port in the switching device, each piece of the network flow information forwarded by the switching device can be accurately collected, improving accuracy of collecting network flow information by the switching device.

In the foregoing embodiment, the network flow statistics collection module 902 further includes the receiving unit, the generation unit, the second obtaining unit, and the sending unit. The receiving unit is configured to receive the network flow information query request sent by the controller, where the request includes the match field. The generation unit is configured to generate the to-be-queried network flow identifier according to the match field. The second obtaining unit is configured to obtain the network flow information corresponding to the to-be-queried network flow identifier. The sending unit is configured to send the network flow information corresponding to the to-be-queried network flow identifier to the controller.

In the foregoing embodiment, the network flow information includes at least one of the following information: a quantity of data packets of the network flow forwarded by the switching device; a size of a data packet of the network flow forwarded by the switching device; an average size of the data packets of the network flow forwarded by the switching device; an interval at which the switching device forwards the data packets of the network flow; a rate of forwarding the network flow by the switching device; or bandwidth occupied by the switching device to forward the network flow.

In the foregoing embodiment, a controller carries specified match field information in a request message, so that a network flow statistics collection module generates a to-be-queried network flow identifier according to the match field information, queries, in storage space, network flow information corresponding to the to-be-queried network flow identifier, and sends the network flow information corresponding to the to-be-queried network flow identifier to the controller. In this way, the controller can accurately obtain network flow information forwarded by each switching device in a network. Further, the controller can provide the obtained network flow information in an API form to an upper-layer application, so as to further aggregate network flow statistical information or use a corresponding policy.

Figure 11:
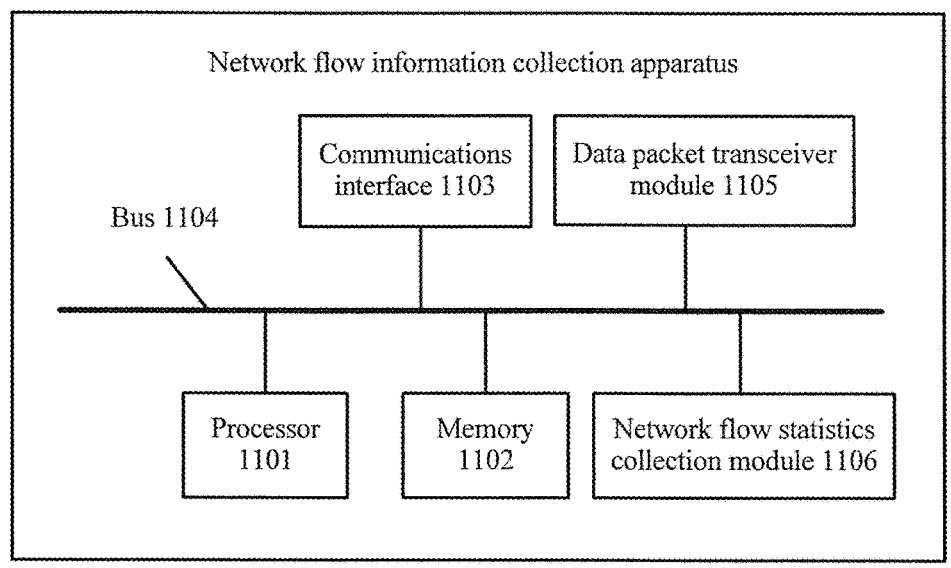
FIG. 11 is a schematic structural diagram of Embodiment 3 of a network flow information collection apparatus according to the present disclosure.

FIG. 11 is a schematic structural diagram of Embodiment 3 of a network flow information collection apparatus according to the present disclosure. The network flow information collection apparatus in this embodiment is a switching device. As shown in FIG. 11, the switching device includes at least a processor 1101, a memory 1102, a communications interface 1103, and a bus 1104. The processor 1101, the memory 1102, and the communications interface 1103 communicate using the bus 1104.

The switching device further includes a data packet transceiver module and a network flow statistics collection module.

The data packet transceiver module 1105 is configured to receive a data packet.

The network flow statistics collection module 1106 is configured to: generate a network flow identifier of the data packet according to all flow entries when the data packet passes from an ingress port to an egress port in the switching device, and update network flow information corresponding to the network flow identifier.

An embodiment of the present disclosure further provides a computer-readable medium that includes a computer executable instruction. The computer executable instruction is used for the switching device to execute the method described in any one of embodiments from Embodiment 1 to Embodiment 3 of the network flow information collection method of the present disclosure.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A network flow information collection method, comprising:
   receiving, by a switching device, a data packet;
   obtaining, by the switching device, identifiers of all flow entries when the data packet passes from an ingress port to an egress port in the switching device;
   generating, by the switching device, a network flow identifier of the data packet by sequentially arranging the identifiers of all the flow entries; and
   updating, by the switching device, network flow information corresponding to the network flow identifier.

2. The method according to claim 1, before updating, by the switching device, network flow information corresponding to the network flow identifier, further comprising:
   establishing storage space for storing the network flow identifier and the network flow information corresponding to the network flow identifier.

3. The method according to claim 2, wherein updating, by the switching device, network flow information corresponding to the network flow identifier comprises:
   searching, by the switching device, whether the storage space stores the network flow identifier of the data packet; and
   updating the network flow information corresponding to the network flow identifier when the storage space stores the network flow identifier of the data packet.

4. The method according to claim 3, further comprising:
   adding the network flow identifier to the storage space when the storage space does not store the network flow identifier of the data packet; and
   updating the network flow information corresponding to the network flow identifier.

5. A network flow information collection method, comprising:
   receiving, by a switching device, a data packet;
   generating, by the switching device, a network flow identifier of the data packet according to all flow entries when the data packet passes from an ingress port to an egress port in the switching device;
   updating, by the switching device, network flow information corresponding to the network flow identifier;
   receiving, by the switching device, a network flow information query request sent by a controller, wherein the request comprises a match field;
   generating, by the switching device, a to-be-queried network flow identifier according to the match field;
   obtaining, by the switching device, network flow information corresponding to the to-be-queried network flow identifier; and
   sending, by the switching device, the network flow information corresponding to the to-be-queried network flow identifier to the controller.

6. The method according to claim 1, wherein the network flow information comprises at least one of the following information:
   a quantity of data packets of the network flow forwarded by the switching device;
   a size of a data packet of the network flow forwarded by the switching device;
   an average size of the data packets of the network flow forwarded by the switching device;
   an interval at which the switching device forwards the data packets of the network flow;
   a rate of forwarding the network flow by the switching device; or
   bandwidth occupied by the switching device to forward the network flow.

7. A network flow information collection apparatus, comprising:
a memory; and
a processor coupled to the memory and configured to:
receive a data packet,
obtain identifiers of all flow entries when the data packet passes from an ingress port to an egress port in a switching device,
generate a network flow identifier of the data packet by sequentially arranging the identifiers of all the flow entries, and
update network flow information corresponding to the network flow identifier.

8. The apparatus according to claim 7, wherein the processor is configured to establish storage space for storing the network flow identifier and the network flow information corresponding to the network flow identifier.

9. The apparatus according to claim 8, wherein the processor is further configured to:
search whether the storage space stores the network flow identifier of the data packet; and
update the network flow information corresponding to the network flow identifier when the storage space stores the network flow identifier of the data packet.

10. The apparatus according to claim 9, wherein the processor is further configured to:
add the network flow identifier to the storage space when the storage space does not store the network flow identifier of the data packet; and
update the network flow information corresponding to the network flow identifier.

11. A network flow information collection apparatus, comprising:
a memory; and
a processor coupled to the memory and configured to:
receive a data packet,
generate a network flow identifier of the data packet according to all flow entries when the data packet passes from an ingress port to an egress port in a switching device, and update network flow information corresponding to the network flow identifier,
check whether flow table space stores a flow entry that matches the data packet,
send the data packet to a controller when the flow table space does not store the flow entry that matches the data packet to enable the controller to generate, according to the data packet, the flow entry that matches the data packet, and
receive the flow entry that matches the data packet and that is sent by the controller.

12. A network flow information collection apparatus, comprising:
a memory; and
a processor coupled to the memory and configured to:
receive a data packet,
generate a network flow identifier of the data packet according to all flow entries when the data packet passes from an ingress port to an egress port in a switching device, and update network flow information corresponding to the network flow identifier,
receive a network flow information query request sent by a controller, wherein the request comprises a match field,
generate a to-be-queried network flow identifier according to the match field,
obtain network flow information corresponding to the to-be-queried network flow identifier, and
send the network flow information corresponding to the to-be-queried network flow identifier to the controller.

13. The apparatus according to claim 11, wherein the processor is further configured to:
receive a network flow information query request sent by the controller, wherein the request comprises a match field;
generate a to-be-queried network flow identifier according to the match field;
obtain network flow infatuation corresponding to the to-be-queried network flow identifier; and
send the network flow information corresponding to the to-be-queried network flow identifier to the controller.

14. The apparatus according to claim 7, wherein the network flow information comprises at least one of the following information:
a quantity of data packets of the network flow forwarded by the switching device;
a size of a data packet of the network flow forwarded by the switching device;
an average size of the data packets of the network flow forwarded by the switching device;
an interval at which the switching device forwards the data packets of the network flow;
a rate of forwarding the network flow by the switching device; or
bandwidth occupied by the switching device to forward the network flow.

15. A network flow information collection apparatus, wherein the network flow information collection apparatus is a switching device, the switching device comprising:
a processor;
a memory;
a communications interface; and
a bus;
wherein the processor, the memory, and the communications interface communicate using the bus; and
wherein the switching device is configured to:
receive a data packet,
obtain identifiers of all flow entries when the data packet passes from an ingress port to an egress port in a switching device,
generate a network flow identifier of the data packet by sequentially arranging the identifiers of all the flow entries, and
update network flow information corresponding to the network flow identifier.

16. A network flow information collection method, comprising:
receiving, by a switching device, a data packet;
determining, by the switching device, whether flow table space stores a flow entry that matches the data packet;
when the flow table space does not store the flow entry that matches the data packet, sending, by the switching device, the data packet to a controller to enable the controller to generate, according to the data packet, the flow entry that matches the data packet;
receiving, by the switching device, the flow entry that matches the data packet and that is sent by the controller;

generating, by the switching device, a network flow identifier of the data packet according to all flow entries when the data packet passes from an ingress port to an egress port in the switching device; and updating, by the switching device, network flow information corresponding to the network flow identifier.

* * * * *